8 # United States Patent Office 3,279,907
Patented Oct. 18, 1966

3,279,907
HERBICIDAL METHOD UTILIZING AROMATIC NITROGEN-CONTAINING HERBICIDES
Jerome Linder, Niagara Falls, Edward D. Weil, Lewiston, and Edwin Dorfman, Grand Island, N.Y., assignors to Hooker Chemical Corporation, Niagara Falls, N.Y., a corporation of New York
No Drawing. Filed June 23, 1965, Ser. No. 466,410
14 Claims. (Cl. 71—2.3)

This application is a continuation-in-part of application Serial Number 143,540, field October 9, 1961.

This invention relates to the use of certain aromatically derived nitrogen-containing compositions as plant growth-controlling materials.

More particularly, this invention describes a method for the control of weeds and the inhibition of growth of weeds from seeds.

In accordance with this invention there is provided a method of controlling plant growth which comprises applying a herbicidally effective amount of a compound of the structure

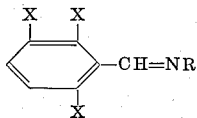

wherein X is halogen, preferably chlorine, and R is an aryl selected from the group consisting of phenyl, naphthyl and phenyl-substituted by at least one substituent selected from the group consisting of halogen, preferably chlorine, carboxy, hydroxyl, nitro, lower alkyl of 1 to 6 carbon atoms and sulfo radicals, to the locus to be treated.

Examples of substituted aryl radicals are mono-, di- and tricarboxyphenyl, mono-, di- and trisulfophenyl, mono-, di- and trihalogenated phenyl, mono-, di- and trinitro-phenyl, mono-, di- and trihydroxyphenyl, mono-, di- and trialkylphenyl, as well as mixtures such as monohalo-dialkylphenyl and dinitromonoalkylphenyl, and the like. It is preferred for reasons of cost, chemical availability and herbicidal activity, to have from 6 to 20 carbon atoms in the group R.

Examples of the compositions of this invention include but are not limited to

N-phenyl-2,3,6-trichlorobenzalimine,
N-p-chlorophenyl-2,3,6-trichlorobenzalimine,
N-α-naphthyl-2,3,6-trichlorobenzalimine,
N-o-carboxyphenyl-2,3,6-trichlorobenzalimine,
N-p-sulfophenyl-2,3,6-trichlorobenzalimine,
N-(2,4,6-trinitrophenyl)-2,3,6-trichlorobenzalimine,
N-(p-nitrophenyl)-2,3,6-trichlorobenzalimine,
N-(2,4-dinitrophenyl)-2,3,6-trichlorobenzalimine,
N-(2,4-dinitro-o-cresyl)-2,3,6-trichlorobenzalimine,
N-(2,6-dinitrophenyl)-2,3,6-trichlorobenzalimine,
N-(p-cresyl)-2,3,6-trichlorobenzalimine,
N-(o-cresyl)-2,3,6-trichlorobenzalimine.

This invention utilizes a series of novel herbicides highly phytotoxic to both monocotyledonous (narrowleaf) weeds or grasses, and dicotyledonous (broadleaf) weed species, and having substantial selectivity so as to permit use in various crops such as corn and sugar cane. These compositions are further advantageous in that they have low volatility with little tendency to leach or decompose in the soil. The effect of this latter characteristic is to impart long term duration or perseverance of the phytotoxic compounds in the soil, necessitating only one application for seasonal effect.

In contrast, many commercially available herbicides such as 2,4-dichlorophenoxyacetic (2,4–D) are of high volatility and cause considerable damage to nearby crops because of drift. Furthermore, 2,4–D is readily decomposed by microorganisms in the soil and thus loses its phytotoxic effect a relatively short time after application and requires expensive and time consuming repeat treatments.

That these compositions have these superior herbicidal attributes at all is most surprising in view of the insufficiencies of closely related compounds. For example, the so-called "parent" imines, the 2,3,6-trihalobenzalimines are physically unstable substances which are worthless as herbicides. The 2,3,6-trihalobenzaldehyde which is the starting material for preparing these compositions is very prone to rapid volatilization from the soil. Thus, the high activity, high stability, and long perseverance of the inventive imines is most surprising and unexpected in view of the prior art literature.

An additional advantage of these novel imines is their ease of formulation. These compositions may be used in any state of purity ranging from a reaction mixture crude to a highly purified crystalline product. The compounds may be formulated alternatively as liquids or solids using inert liquids or solids as carriers or diluents. Examples of liquid diluents or carriers include water, alcohols, glycols, ketones, esters and aliphatic and aromatic hydrocarbons. Examples of solid carriers are micas, sand, clays, talcs, vegetable flours, silicas, diatomaceous earths, alkaline earth carbonates, phosphates, oxides and hydroxides among others.

A further advantage of the novel imines of this invention is their compatibility with other pesticidal compositions including fungicides, nematocides, insecticides and other herbicides. For example, the imines may be combined with other herbicides such as the 2,4-dinitro-6-alkylphenols, pentachlorophenol, ammate, the phenylureas such as N-m-trifluoromethylphenyl-N'-N'-dimethylurea, N-p-chlorophenoxyphenyl-N',N'-dimethylurea, linuron, monuron or diuron, the triazines such as 2,4-dialkyl-amino - 6 - methoxy - sym-triazines, 2,4-dialkylamino-6-methylthio - sym-triazine, 2,4-dialkylamino-6-chloro-sym-triazine, the chlorophenoxyaliphatic acids such as 2,4–D and 2,4,5–T, the trichloroacetates, chlorates, dichloropropionates, borates, S-alkyl-N,N-dialkylthiocarbamates, α-chloro-N-substituted acetamides, α-chloro-N,N-disubstituted acetamides such as α-chloro-N,N-dialkylacetamide, the chlorobenzoic acids such as trichloro- and polychlorobenzoic acids, trichloroaminopicolinic acid, aminotriazole, diphenylacetamides, dichlorobenzonitriles, herbicidal uracils, 3-amino-2,5-dichlorobenzoic acid, and the like. Optionally, the imines may be combined with fungicides such as sulfur, captan or the metal dimethylthiocarbamates. Typical compatible insecticides are malathion, chlordane, DDT, benzene hexachloride and the like. Soil sterilants such as the alkali and alkaline earth metal chlorates and borates, and the above-mentioned triazines and ureas appear to have an enhanced effect greater than additive, by combination with the inventive compositions.

Frequently in the course of preparing the above listed liquid or solid formulations containing the herbicidal imines be themselves or combined with other herbicides or pesticides, it may be desirable to modify or condition the physical properties of the pesticidal compositions. This can be done effectively by including one or more substances variously referred to as surface active agents, wetting agents, detergents, suspending agents, dispersing agents, thickening agents, emulsifying agents, or the like. These substances which simplify or improve formulation or application frequently enhance or potentiate the scope, effectiveness of duration of these formulations and are generically referred to as adjuvants. A list of such agents which are satisfactory may be found in "Detergents and Emulsifiers," published by John W. McCutcheon, Inc., Morristown, New Jersey, 1962.

As indicated above, the imines of this invention can be made up as solid formulations such as powders, wettable dusts, pellets, granules, and the like, and may be hand or mechanically broadcast, disced, rototilled, plowed or otherwise admixed with or into the soil. Where liquid formulations are utilized the solutions are sprayed on to the locus of the plants to be treated. The rate of application will be variable dependent upon such factors as soil structure, climate, type of use pre- or post-emergence, type of weeds encountered, and their stage of growth. However, under average conditions the novel imines of this invention are effective at rates between one-quarter to one hundred pounds per acre with one to twenty-five pounds being a more ordinary range. Where post-emergence treatments are the objects, higher rates are generally required and rates between two and one hundred pounds per acre and over are workable, with five to fifty pounds per acre being typical. For long term soil sterilization, amounts of ten to two hundred pounds per acre and even in excess of the upper figure may be required under adverse combinations of conditions or where recalcitrant mature, deeply rooted perennial plants are encountered.

The preferred method of application is to apply the compositions pre-emergence as a spray in early spring after plowing and discing the soil to remove as much weed growth as possible.

The crystalline compositions of this invention are prepared by contacting equimolar quantities of 2,3,6-trihalobenzaldehyde with the appropriate primary aromatic amine in the presence of an inert organic solvent such as benzene, toluene or any other aromatic or aliphatic solvent having a boiling point above twenty-five degrees centigrade. A convenient preparation procedure is to use inert organic solvent such as benzene which forms a low boiling azeotrope which can be distilled off and thus removes the water formed during the reaction. The excess benzene or other solvent is removed by evaporation and the residue may be decanted off or recrystallized from a suitable inert solvent or solvent mixture such as benzene-hexane.

Additional examples illustrating the inventive concepts, compositions, formulations and methods appear below. All temperatures are in degrees centigrade and all parts are by weight unless otherwise noted. Except as set forth in the claims, these examples are not to be construed as a limitation of this invention in either its composition or method aspects.

*Example 1.—Preparation of herbicidal compounds*

Forty-two parts of 2,3,6-trichlorobenzaldehyde, twenty-eight parts of o-chloroaniline, and forty parts of benzene were refluxed, removing the water evolved by the reaction as the benzene-water azeotrope. The benzene was then stripped and the residue recrystallized from a benzene-hexane mixture, to obtain fifty-four parts of colorless crystalline solid, melting point one hundred and fifteen to one hundred and sixteen degrees centigrade.

*Analysis.*—Calculated for $C_{13}H_7Cl_4N$: N, 4.4 percent. Found: N, 4.4 percent.

*Examples 2–9*

By procedures similar to that of Example 1, the following representative compounds were prepared:

| | Percent N Calculated | Percent N Found |
|---|---|---|
| N-phenyl-2,3,6-trichlorobenzalimine, M.P. 61–62 degrees centigrade (Example 2) | 4.9 | 4.8 |
| N-p-chlorophenyl-2,3,6-trichlorobenzalimine, M.P. 94–96 degrees centigrade (Example 3) | 4.4 | 4.2 |
| N-m-chlorophenyl-2,3,6-trichlorobenzalimine, M.P. 101 degrees centigrade (Example 4) | 4.4 | 4.3 |
| N-α-naphthyl-2,3,6-trichlorobenzalimine, M.P. 128–130 degrees centigrade (Example 5) | 4.2 | 4.1 |
| N-o-carboxyphenyl-2,3,6-trichlorobenzalimine, M.P. 169–171 degrees centigrade (Example 6) | 4.3 | 4.6 |
| N-p-sulfophenyl-2,3,6-trichlorobenzalimine (sodium salt), decomposition above 200 degrees centigrade (Example 7) | 3.6 | 3.4 |
| N-p-nitrophenyl-2,3,6-trichlorobenzalimine, decomposition above 150 degrees centigrade (Example 8) | 8.5 | 8.2 |
| N-xylyl-2,3,6-trichlorobenzalimine (from mixed xylidine), M.P. 53–66 degrees centigrade (Example 9) | 4.5 | 4.4 |

*Examples 10–20*

By procedures similar to Example 1, the following additional imines are prepared for herbicidal evaluation. Since only herbicidal use is contemplated, the crude reaction products are used without further purification. Infrared analysis established the identity of the compositions:

N-(2,4-dinitrophenyl) - 2,3,6 - trichlorobenzalimine (Example 10)

N-(o-nitrophenyl)-2,3,6-trichlorobenzalimine (Example 11)

N-(2,6-dinitro-p-cresyl)-2,3,6 - trichlorobenzalimine (Example 12)

N-(2,6-dinitrophenyl) - 2,3,6 - trichlorobenzalimine (Example 13)

N-(p-cresyl)-2,3,6-trichlorobenzalimine (Example 14)

N-(o-cresyl)-2,3,6-trichlorobenzalimine (Example 15)

N-(p-hydroxyphenyl) - 2,3,6 - trichlorobenzalime (Example 16)

N-(o-oxylyl)-2,3,6-trichlorobenzalimine (Example 17)

N-(m-xylyl)-2,3,6-trichlorobenzalimine (Example 18)

N-(p-tertiarybutylphenyl)-2,3,6-trichlorobenzalimine (Example 19)

N-(2,4,6-trichlorophenyl) - 2,3,6 - trichlorobenzalimine (Example 20)

*Example 21.—Preparation of herbicidal compositions*

The following ingredients are blended:

| | Parts by weight |
|---|---|
| N-o-cresyl-2,3,6-trichlorobenzalimine | 50 |
| Non-ionic emulsifier (polyoxyethylene sorbitan ether) | 40 |
| Xylene | 150 |

The mixture is an oil emulsifiable with water.

*Example 22*

The following ingredients are blended:

| | Parts by weight |
|---|---|
| N-(2,6-dinitrophenyl)-2,3,6-trichlorobenzalimine | 5 |
| Attapulgus clay | 95 |

The constituents are blended to make a dust.

A representative method of use of the compounds of our invention is illustrated by the following example:

Example 23

The following ingredients are blended:

| | Parts by weight |
|---|---|
| N-(p-sulfophenyl)-2,3,6-trichlorobenzalimine (sodium salt) | 50 |
| Clay (Microcel E) | 40 |
| Dispersing agent (lignin sulfonic acid salt) | 5 |
| Wetting agent (sodium alkylnaphthalene sulfonate) | 5 |

The constituents are pulverized in an air-mill to prepare a powder.

Examples 24–38—Herbicidal methods

An area infested with seeds of pigweed, mustard, crabgrass and ragweed was plowed, disced and seeded with corn. The seeded area was divided into plots which were sprayed with aqueous dispersions of the compositions of this invention at the rate of three pounds per acre. One month later, the treated and untreated plots were inspected and the weed control relative to the unsprayed control areas was estimated and the following results obtained:

| Example | Chemical of Ex. No. | Percent Control of Indicated Species | | | | Corn Damage |
|---|---|---|---|---|---|---|
| | | Pigweed | Mustard | Ragweed | Crabgrass | |
| 24 | 1 | 100 | 90 | 100 | 70 | Nil |
| 25 | 2 | 100 | 100 | 100 | 60 | Nil |
| 26 | 3 | 100 | 90 | 100 | 80 | Nil |
| 27 | 4 | 100 | 90 | 100 | 80 | Nil |
| 28 | 5 | 100 | 100 | 100 | 80 | Nil |
| 29 | 6 | 100 | 90 | 100 | 70 | Nil |
| 30 | 7 | 100 | 90 | 100 | 80 | Nil |
| 31 | 8 | 100 | 90 | 100 | 90 | Nil |
| 32 | 9 | 100 | 85 | 100 | 80 | Nil |
| 33 | 11 | 100 | 100 | 100 | 70 | Nil |
| 34 | 12 | 100 | 95 | 100 | 60 | Nil |
| 35 | 13 | 100 | 100 | 100 | 100 | Nil |
| 36 | 14 | 100 | 90 | 100 | 60 | Nil |
| 37 | 15 | 100 | 90 | 100 | 50 | Nil |
| 38 | 16 | 100 | 80 | 100 | 60 | Nil |

Example 39 (comparative)

Fifty milligrams of each compound indicated below were dissolved in one milliliter of a stock solvent-emulsifier blend (one part mixed ionic-nonionic emulsifier, 1.5 parts xylene and 0.5 part isophorone) and emulsified in twenty milliliters of water to make the pray emulsion. The emulsion was sprayed onto greenhouse flats of 8×10.5 inches size so that the application rate of the chemical was eight pounds per acre. The flats were seeded, shortly before spraying, with seven plants species, selected to duplicate the responses to be expected from typical weed species. The herbicidal results were evaluated two weeks later, using the customary rating scale of 0 to 10 where 0 equals no effect, 10 being complete kill or failure to emerge, 1–3 being increasing degrees of mild injury or repression, 4–6 being increasing in degree of moderate injury or repression, and 7–9 being increasing degrees of severe injury or repression. The date obtained are as follows:

CONTROL RATING ON SPECIES INDICATED

| Plant | Chemical | |
|---|---|---|
| | N-phenyl-2,3,6-Trichlorobenzalimine | N-phenyl-2,4,6-Trichlorobenzalimine |
| Cabbage | 10 | 0 |
| Ryegrass | 10 | 0 |
| Pigweed | 10 | 5 |
| Crabgrass | 10 | 0 |
| Tomatoes | 10 | 2 |
| Millet | 10 | 0 |
| Cucumbers | 10 | 5 |

Although certain preferred embodiments of the invention have been disclosed for the purpose of illustration, it will be evident that various changes and modifications may be made therein without departing from the scope and spirit of this invention.

What is claimed is:

1. A method for controlling the growth of weeds comprising applying a herbicidally effective amount of a compound of the structure:

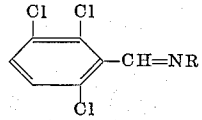

wherein R selected from the group consisting of phenyl, naphthyl and phenyl-substituted by at least one substituent selected from the group consisting of chlorine, carboxy, hydroxy, nitro, lower alkyl and sulfo radicals, to the locus to be treated.

2. The method of claim 1 wherein the compound applied is N-phenyl-2,3,6-trichlorobenzalimine.

3. The method of claim 1 wherein the compound applied is N-(p-chlorophenyl)-2,3,6-trichlorobenzalimine.

4. The method of claim 1 wherein the compound applied is N-(m-chlorophenyl)-2,3,6-trichlorobenzalimine.

5. The method of claim 1 wherein the compound applied is N-(α-naphthyl)-2,3,6-trichlorobenzalimine.

6. The method of claim 1 wherein the compound applied is (N-(o-carboxyphenyl)-2,3,6-trichlorobenzalimine.

7. The method of claim 1 wherein the compound applied is N-(p-hydroxypenzyl)-2,3,6-trichlorobenzalimine.

8. The method of claim 1 wherein the compound applied is N-(o-nitrophenyl)-2,3,6-trichlorobenzalimine.

9. The method of claim 1 wherein the compound applied is N-(2,6-dinitrophenyl)-2,3,6-trichlorobenzalimine.

10. The method of claim 1 wherein the compound applied is N-(2,6-dinitro-p-cresyl)-2,3,6-trichlorobenzalimine.

11. The method of claim 1 wherein the compound applied is N-(2,4-dinitrophenyl)-2,3,6-trichlorobenzalimine.

12. The method of claim 1 wherein R is lower alkylphenyl.

13. The method of claim 1 wherein the compound applied is (N-(p-nitrophenyl)-2,3,6-trichlorobenzalimine.

14. A method for controlling the growth of weeds comprising appying a herbicidally effective amount of a composition comprising a compound of the structure:

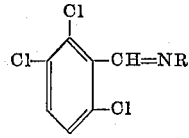

wherein R is selected from the group consisting of phenyl, naphthyl and phenyl-substituted by at least one substituent selected from the group consisting of chlorine, carboxy, hydroxy, nitro, lower alkyl and sulfo radicals and a carrier to the locus to be treated.

No references cited.

LEWIS GOTTS, *Primary Examiner.*